(12) United States Patent
Chevalier, Jr.

(10) Patent No.: US 9,274,023 B2
(45) Date of Patent: Mar. 1, 2016

(54) FLEXIBLE LID SEAL INTEGRITY SENSOR

(71) Applicant: Teledyne Instruments, Inc., Thousand Oaks, CA (US)

(72) Inventor: Robert A. Chevalier, Jr., East Falmouth, MA (US)

(73) Assignee: TELEDYNE INSTRUMENTS, INC., Thousand Oaks, CA (US)

( * ) Notice: Subject to any disclaimer, the term of this patent is extended or adjusted under 35 U.S.C. 154(b) by 255 days.

(21) Appl. No.: 13/800,594

(22) Filed: Mar. 13, 2013

(65) Prior Publication Data
US 2014/0260557 A1    Sep. 18, 2014

(51) Int. Cl.
*G01M 3/00*    (2006.01)
*G01M 3/36*    (2006.01)

(52) U.S. Cl.
CPC .................................. *G01M 3/36* (2013.01)

(58) Field of Classification Search
CPC ....... G01M 3/363; G01M 3/366; G01M 3/04; G01M 3/16; G01M 3/36
USPC .................................. 73/45.4, 49.3, 52
See application file for complete search history.

(56) References Cited

U.S. PATENT DOCUMENTS

| | | | | |
|---|---|---|---|---|
| 4,306,448 A | * | 12/1981 | Rohde .................... | G01M 3/36 209/529 |
| 4,315,427 A | * | 2/1982 | Leiter ..................... | G01M 3/36 209/529 |
| 4,706,494 A | * | 11/1987 | Creed ..................... | G01M 3/36 73/49.3 |
| 4,747,299 A | * | 5/1988 | Fox ........................ | G01M 3/363 73/49.3 |
| 4,771,630 A | * | 9/1988 | Croce .................... | G01M 3/363 73/49.3 |
| 4,899,574 A | * | 2/1990 | Potteiger .............. | G01M 3/366 73/49.3 |
| 4,934,180 A | | 6/1990 | Hulsman | |
| 5,029,463 A | | 7/1991 | Schvster et al. | |
| 5,082,366 A | | 1/1992 | Tyson et al. | |
| 5,105,654 A | * | 4/1992 | Maruyama ............ | G01M 3/363 73/49.3 |
| 5,111,684 A | * | 5/1992 | Stauffer ................ | G01M 3/366 73/49.3 |
| 5,156,329 A | * | 10/1992 | Farrell ................ | B29C 65/8246 220/359.3 |
| 5,195,360 A | * | 3/1993 | Knigge ................... | G01M 3/36 73/49.3 |
| 5,199,296 A | * | 4/1993 | Lehmann .............. | G01M 3/329 73/45.4 |
| 5,287,729 A | * | 2/1994 | Lehmann .............. | G01M 3/363 73/49.3 |

(Continued)

FOREIGN PATENT DOCUMENTS

| | | |
|---|---|---|
| DE | 102004016549 A1 | 10/2005 |
| EP | 0380863 A1 | 8/1990 |

OTHER PUBLICATIONS

International Search Report and Written Opinion for PCT/US2014/022040, dated Jun. 26, 2014 (12 pages).

(Continued)

*Primary Examiner* — Laura Martin
*Assistant Examiner* — Samir M Shah
(74) *Attorney, Agent, or Firm* — K&L Gates LLP

(57) ABSTRACT

In various embodiments, a flexible lid seal detector is disclosed. The flexible lid seal detector comprises a compression body. A compression rim extends from a distal end of the compression body. The compression rim comprises an outer perimeter and inner perimeter. The inner perimeter defines a recessed lid deflection area. The compression rim is configured to apply a force to a flexible lid coupled to a container. A sensor is coupled to the compression body and positioned to detect the deflection of the flexible lid in response to the force applied to the flexible lid. The sensor is configured to detect an amount of deflection of the flexible lid within the recessed lid deflection area.

21 Claims, 9 Drawing Sheets

(56) References Cited

U.S. PATENT DOCUMENTS

| | | | | | |
|---|---|---|---|---|---|
| 5,365,774 | A | * | 11/1994 | Horlacher | G01M 3/363 73/45.4 |
| 5,497,654 | A | * | 3/1996 | Lehmann | G01M 3/329 73/49.3 |
| 5,513,516 | A | * | 5/1996 | Stauffer | G01M 3/329 73/49.2 |
| 5,528,925 | A | | 6/1996 | Sherepa et al. | |
| 6,167,751 | B1 | * | 1/2001 | Fraim | G01M 3/363 73/49.3 |
| 6,330,823 | B1 | * | 12/2001 | Raymond | G01M 3/3218 73/41 |
| 6,609,414 | B2 | * | 8/2003 | Mayer et al. | 73/40.7 |
| 7,571,636 | B2 | * | 8/2009 | Mayer | G01M 3/3272 73/49.3 |
| 7,578,170 | B2 | * | 8/2009 | Mayer | G01M 3/226 73/49.3 |
| 7,624,623 | B2 | * | 12/2009 | Mayer | G01M 3/3272 73/195 |
| 8,327,690 | B2 | * | 12/2012 | Bonfiglioli | G01M 3/363 73/49.3 |
| 8,443,806 | B2 | * | 5/2013 | Morelli | G01M 3/36 128/207.12 |
| 2013/0104664 | A1 | * | 5/2013 | Chevalier, Jr. | G01M 3/36 73/763 |

OTHER PUBLICATIONS

International Preliminary Report on Patentability for PCT/US2014/022040, issued Sep. 15, 2015 (9 pages).

* cited by examiner

FLEXIBLE LID SEAL INTEGRITY SENSOR

BACKGROUND

Flexible lids are used for sealing containers in a variety of industries, including food packaging, medical supplies, and industrial supplies. In most applications, the flexible lid is sealed to the container to protect the product within the container. The seal must be a high integrity seal to prevent leaking of air into and/or out of the container. Seals need to be tested during manufacture to ensure that the product is protected within the container for shipment and storage.

SUMMARY

In various embodiments, a flexible lid seal detector is disclosed. The flexible lid seal detector comprises a compression body. A compression rim extends from a distal end of the compression body. The compression rim comprises an outer perimeter and inner perimeter. The inner perimeter defines a recessed lid deflection area. The compression rim is configured to apply a force to a flexible lid coupled to a container. A sensor is coupled to the compression body and positioned to detect the deflection of the flexible lid in response to the force applied to the flexible lid. The sensor is configured to detect an amount of deflection of the flexible lid within the recessed lid deflection area.

In various embodiments, a flexible lid seal detection system is disclosed. The flexible lid seal detection system comprises a flexible lid seal detector. The flexible lid seal detector comprises a compression body. A compression rim extends from a distal end of the compression body. The compression rim comprises an outer perimeter and inner perimeter. The inner perimeter defines a recessed lid deflection area. The compression rim is configured to apply a force to a flexible lid coupled to a container. A sensor is coupled to the compression body and positioned to detect the deflection of the flexible lid in response to the force applied to the flexible lid. The sensor is configured to detect an amount of deflection of the flexible lid within the recessed lid deflection area. The flexible lid seal detection system further comprises a cylinder coupled to the proximal end of the compression body. The cylinder is configured to extend in a proximal direction. When the cylinder is in an extended position, the compression rim applies the predetermined force to the flexible lid.

In various embodiments, a method for inspecting a seal between a container and a flexible lid is disclosed. The method comprises compressing, using a compression body, a portion of a flexible lid. The compression body comprises a compression rim extending from a distal end of the compression body. The compression rim comprises an outer perimeter and an inner perimeter. The inner perimeter defines a recessed lid deflection area. The compression rim is configured to apply a force to the flexible lid coupled to a container to form a seal. The method further comprises detecting, by a sensor, a deflection of the flexible lid in response to the force applied to the flexible lid. The sensor is located at the distal end of the compression body and within the recessed lid deflection area. The method further comprises determining, by a processor, an integrity of the seal between the flexible lid and the container. An amount of deflection of the flexible lid corresponds to the seal between the flexible lid and the container.

FIGURES

The features of the various embodiments are set forth with particularity in the appended claims. The various embodiments, however, both as to organization and methods of operation, together with advantages thereof, may best be understood by reference to the following description, taken in conjunction with the accompanying drawings as follows:

DESCRIPTION

Figure 1:
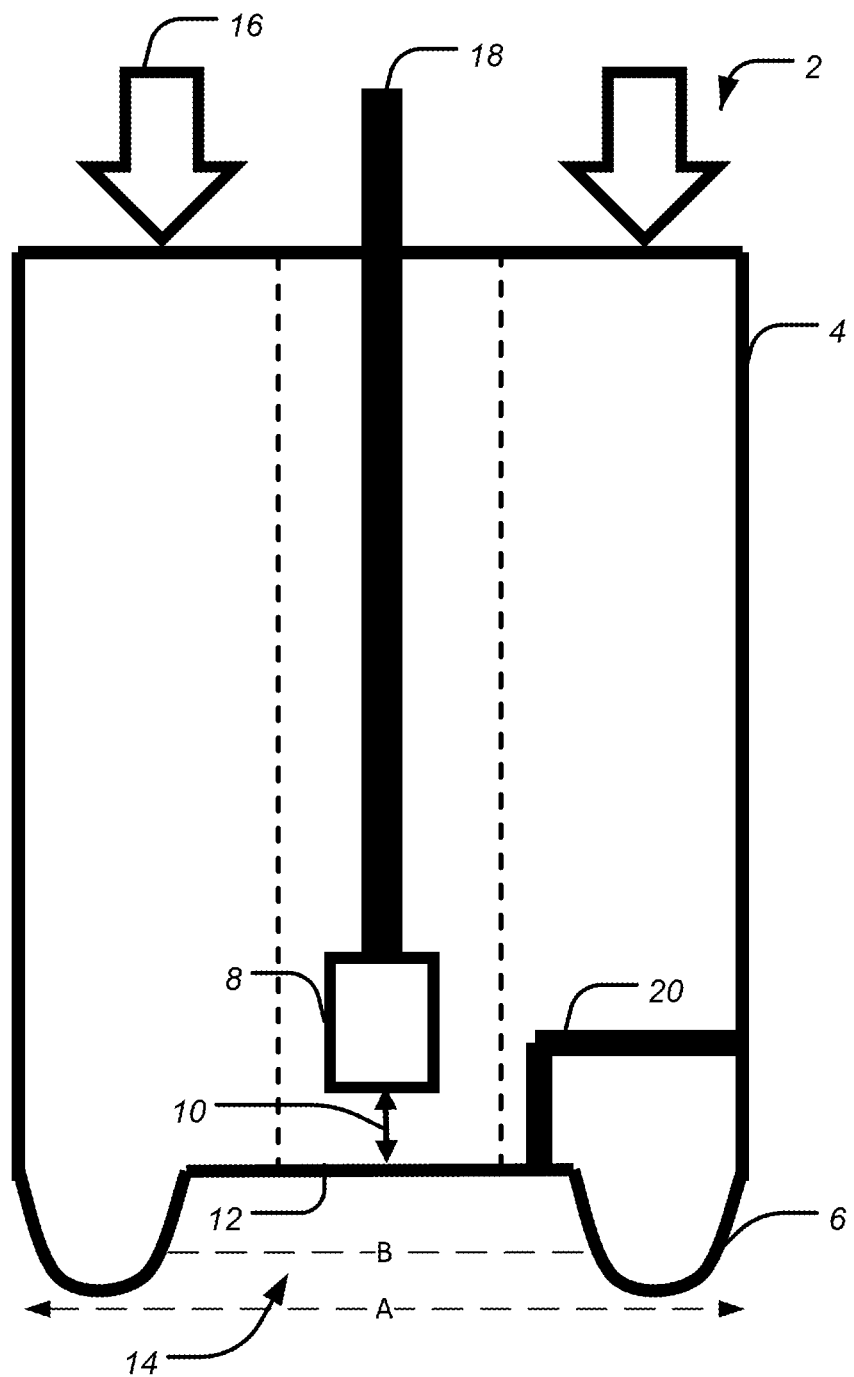
FIG. 1 illustrates one embodiment of a flexible lid seal detector.

In various embodiments, a flexible lid seal detector is disclosed. The flexible lid seal detector comprises a compression body. A compression rim extends from a distal end of the compression body. The compression rim comprises an outer perimeter and inner perimeter. The inner perimeter defines a recessed lid deflection area. The compression rim is configured to apply a force to a flexible lid coupled to a container. A sensor is coupled to the compression body and positioned to detect the deflection of the flexible lid in response to the force applied to the flexible lid. The sensor is configured to detect an amount of deflection of the flexible lid within the recessed lid deflection area.

In various embodiments, a flexible lid seal detection system is disclosed. The flexible lid seal detection system comprises a flexible lid seal detector. The flexible lid seal detector comprises a compression body. A compression rim extends from a distal end of the compression body. The compression rim comprises an outer perimeter and inner perimeter. The inner perimeter defines a recessed lid deflection area. The compression rim is configured to apply a force to a flexible lid coupled to a container. A sensor is coupled to the compression body and positioned to detect the deflection of the flexible lid in response to the force applied to the flexible lid. The sensor is configured to detect an amount of deflection of the flexible lid within the recessed lid deflection area. The flexible lid seal detection system further comprises a cylinder coupled to the proximal end of the compression body. The cylinder is configured to extend in a proximal direction. When the cylinder is in an extended position, the compression rim applies the predetermined force to the flexible lid.

In various embodiments, a method for inspecting a seal between a container and a flexible lid is disclosed. The method comprises compressing, using a compression body, a portion of a flexible lid. The compression body comprises a compression rim extending from a distal end of the compression body. The compression rim comprises an outer perimeter and an inner perimeter. The inner perimeter defines a recessed lid deflection area. The compression rim is configured to apply a force to the flexible lid coupled to a container to form a seal. The method further comprises detecting, by a sensor, a deflection of the flexible lid in response to the force applied to the flexible lid. The sensor is located at the distal end of the compression body and within the recessed lid deflection area. The method further comprises determining, by a processor, an integrity of the seal between the flexible lid and the container. An amount of deflection of the flexible lid corresponds to the seal between the flexible lid and the container.

Reference will now be made in detail to several embodiments, including embodiments showing example implementations of a flexible lid seal detector. Wherever practicable similar or like reference numbers may be used in the figures and may indicate similar or like functionality. The figures depict example embodiments of the disclosed systems and/or methods of use for purposes of illustration only. One skilled in the art will readily recognize from the following description that alternative example embodiments of the structures and methods illustrated herein may be employed without departing from the principles described herein.

FIG. 1 illustrates a cross-sectional view of one embodiment of a flexible lid seal detector 2. The flexible lid seal detector 2 may comprise a compression body 4. The compression body 4 may comprise a compression rim 6 extending from the distal end 12 of the compression body 4. The compression rim 6 may be configured to apply a force 16 to a flexible lid coupled to a container. The compression body 4 and/or the compression rim 6 may comprise any suitable shape for applying the force 16 to the flexible lid. For example, in some embodiments, the compression body 4 and/or the compression rim 6 may comprise a circular cross-section for applying a force 16 to a circular lid or a square cross-section for applying a force 16 to a square lid.

The compression body 4 and/or the compression rim 6 may comprise an outer perimeter A. The compression rim may comprise an inner perimeter B. The inner perimeter B may define a recessed lid deflection area 14. The recessed lid deflection area 14 may comprise a hollow area or void located within the inner perimeter B of the compression rim 6. The recessed lid deflection area 14 may be configured to receive a portion of a flexible lid therein. A portion of a flexible lid may be deflected into the lid deflection area 14 when the compression rim 6 applies a force to the flexible lid. In some embodiments, the compression rim 6 may be located in the center of the compression body 4 and the outer perimeter of the compression rim 6 may define a lid deflection area between the outer perimeter of the compression rim 6 and the outer perimeter of the compression body 4. In some embodiments, the compression rim 6 may comprise a rounded distal end. The rounded distal end may have a smooth curvature to prevent damaging a flexible lid when the compression rim 6 applies a force 16 to the flexible lid. The compression body 4 and/or the compression rim 6 may comprise any suitable material for applying a force 16 to a flexible lid. For example, in various embodiments, the compression body 4 and/or the compression rim 6 may comprise aluminum, stainless steel, and/or plastic. The material may be selected, for example, based on a material of the flexible lid to be tested, a material of the container to be tested, a strength of the flexible lid to be tested, a product type, and/or an application type.

In one embodiment, the dimensions of the lid seal detector 2 may be related to the dimensions of a container and/or a flexible lid. For example, in one embodiment, the compression body 4 may comprise an outer width A based on a percentage of the diameter of the flexible lid to be tested. The outer width A of the compression body 4 may correspond to, for example, 50%-95% of the diameter of a flexible lid and/or a container to be inspected. In some embodiments, the outer width of the compression rim 6 may be equal to the outer width A of the compression body 4. An inner perimeter B of the compression rim 6 may be related to the dimensions of a container and/or a flexible lid. For example, the compression rim 6 may comprise an inner perimeter B of 70%-90% of the diameter of the flexible lid 126. In another embodiment, the inner perimeter B may be related to the outer width A of the compression body 4 and may comprise, for example, 5%-20% of the outer width A. Those skilled in the art will recognize that the above numbers are given merely as examples, and that any suitable outer width A and/or inner diameter B may be used.

In some embodiments, a sensor 8 may be coupled to the compression body 4 and may be positioned to detect the deflection of a flexible lid within the deflection area. The sensor 8 may be formed integrally with the compression body 6, may be inserted into a recess in the compression body 6, or may be attached to the distal end 12 of the compression body 4. In some embodiments, the sensor 8 may be located within a cavity in the compression body 4. The cavity may comprise an open distal end 12 and the sensor 8 may detect the deflection of the flexible lid within the lid deflection area 14 through the cavity. In some embodiments, the sensor 8 may be positioned concentric with the compression body 4. The sensor 8 may be positioned any suitable distance 10 from the flexible lid deflection area 14 to facilitate proper detection of the deflected flexible lid. In some embodiments, the sensor 8 may be coupled to one or more processors through a wired and/or wireless connection. For example, the sensor 8 may be electrically coupled to one or more processors by a wire 18. In some embodiments, the sensor 8 may receive power from the wire 18.

The sensor 8 may comprise any suitable sensor for detecting the deflection of the flexible lid into the recessed lid deflection area 14, such as, for example, analog or digital sensors. In some embodiments, the sensor 8 may comprise a proximity sensor configured to detect the distance between a flexible lid and the sensor 8. The distance between the flexible lid and the sensor 8 may vary based on the amount of deflection of the flexible lid. The sensor 8 may comprise any suitable proximity sensor, such as, for example, a magnetic proximity sensor, a photoelectric proximity sensor, a capacitive proximity sensor, an eddy-current sensor, an inductive proximity sensor, a laser rangefinder proximity sensor, a radiofrequency proximity sensor, and/or an ultrasonic proximity sensor, to name just a few. In some embodiments, the sensor 8 may comprise a pressure sensor configured to detect a pressure increase within the recessed lid deflection area 14 caused by the deflection of a flexible lid, such as, for example, an electronic pressure sensor. The pressure increase may correspond to the amount of deflection of the flexible lid. The sensor 8 may comprise any suitable pressure sensor, such as, for example, a manometer, a pressure gauge, a capacitive pressure sensor, a piezoresistive strain gauge, an electromagnetic pressure sensor, a piezoelectric pressure sensor, an optical pressure sensor, a resonant pressure sensor, a thermal pressure sensor, or an ionization pressure sensor, to name just a few.

In some embodiments, the sensor 8 may comprise one or more electrical contacts on the distal end 12 of the compression body 4. The electrical contacts may be located, for example, at the center point of the distal end 12 and on the compression rim 6. The electrical contacts may be configured to measure a resistance of the flexible lid, which may change in response to an amount of deflection of the flexible lid. For example, in one embodiment the flexible lid may comprise a foil material. The resistance of the foil material may change proportionally to the amount of deflection of the flexible lid. The change in resistance may be detected by electrical contacts on the compression body 4 and/or the compression rim 6. In some embodiments, the sensor 8 may comprise a load cell to measure a center pressure of the flexible lid. The load cell may comprise, for example, a metal or plastic load cell.

In some embodiments, the sensor 8 may comprise an analog sensor configured to detect the distance between the sensor 8 and the flexible lid within a given range. The amount of deflection of the flexible lid may correspond to the integrity of a seal between the flexible lid and a container. The analog proximity sensor may have a specific range of measurement. For example, in one embodiment, the analog proximity sensor may have about a 6 mm measurement range. The analog proximity sensor may produce an output, for example, about 0 to about 10V, proportional to the distance between the sensor 8 and the flexible lid. The output of the analog proximity sensor may correspond to a seal between the flexible lid and the container. For example, a good seal may correspond to a higher output of the analog proximity sensor than a bad seal.

In some embodiments, the sensor 8 may be electrically coupled to a signal processing module. The signal processing module may receive a signal from the sensor 8 indicative of the amount of deflection of the flexible lid. The signal processing module may determine, based on the signal from the sensor 8, the integrity of the seal between the flexible lid and the container. In some embodiments, the signal processing module 8 may be configured to provide a warning to an operator for a low integrity seal. In some embodiments, the signal processing module may be coupled to one or more mechanical systems for removing the container comprising a low integrity seal from, for example, a production line.

Figure 2:
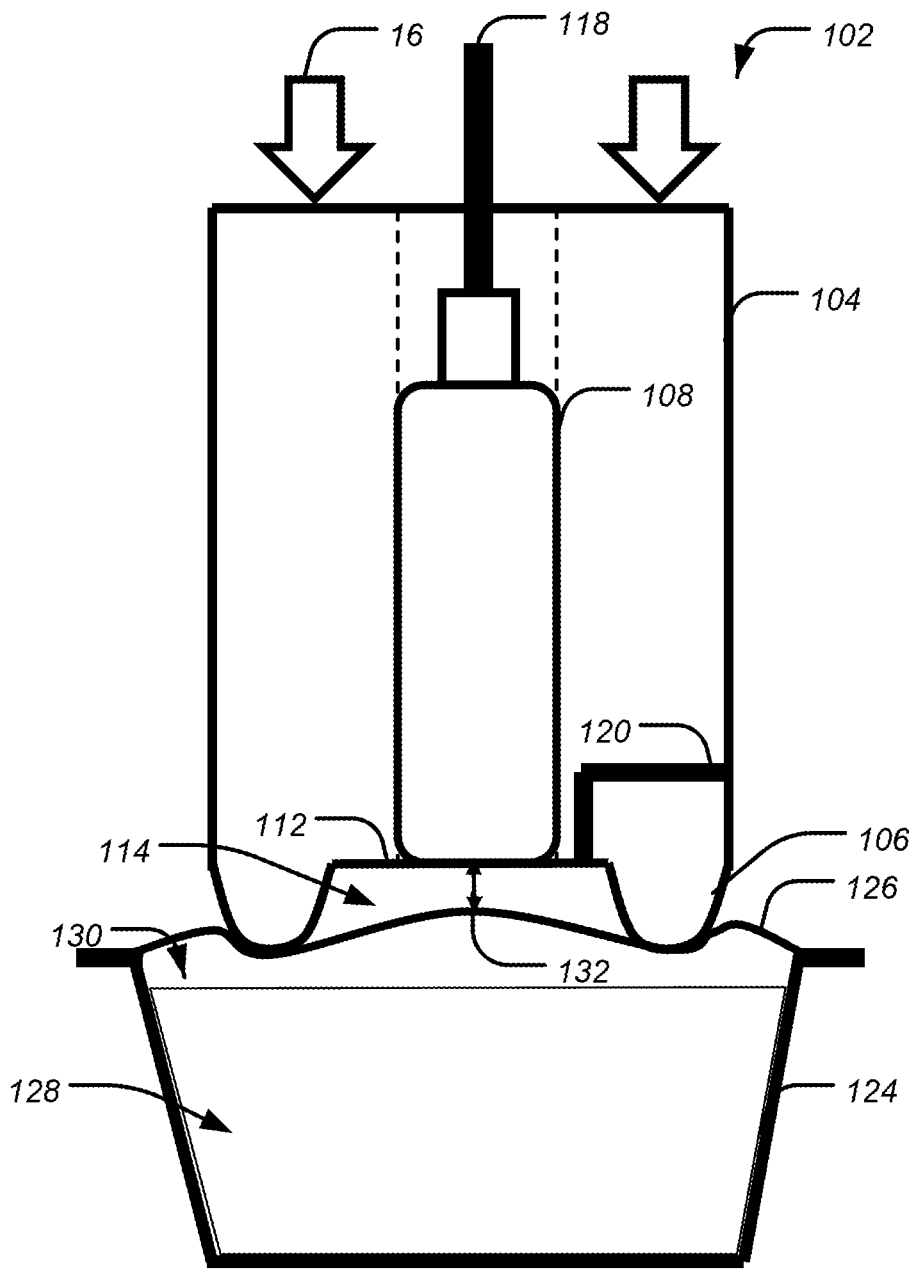
FIG. 2 illustrates one embodiment of a flexible lid seal detector and a flexible lid comprising a good seal.

FIG. 2 illustrates one embodiment of a flexible lid seal detector and a flexible lid comprising a good seal. The flexible lid seal detector 102 may comprise a compression body 104 and a compression rim 106 extending from the distal end 112 of the compression body 104. The compression rim 106 may comprise an inner perimeter and an outer perimeter. The inner perimeter may define a flexible lid deflection area 114. The compression rim 106 may be configured to apply a force 16 to a flexible lid 126 coupled to a container 124. The container may comprise any suitable container for storing a product 128, such as, for example, a rigid, semi-rigid, or flexible container. The flexible lid 126 and the container 124 may form a seal therebetween to prevent fluids, such as air or gas, for example, from entering or exiting the container 124. The container 124 may comprise a headspace 130 between the product 128 and the flexible lid 126. The headspace 130 may comprise a pocket of air or other gas between the flexible lid 126 and a product 128 located in the container 124. The headspace 130 may provide a buffer between the product 128 and the flexible lid 126. In some embodiments, the product 128 may comprise, at least partially, a gas and the headspace 130 may not be included. Those skilled in the art will recognize that references throughout the current disclosure to headspace and headspace pressure may apply equally to a container 124 comprising a gaseous product without a headspace 130.

In some embodiments, the compression rim 106 may be configured to apply a force 16 to the flexible lid 126. The compression rim 106 may be configured to apply the force 16 to a portion of the flexible lid 126 located within an inner diameter of the container 124. For example, in some embodiments, the compression rim 106 may be configured to apply the force 16 to a section of the flexible lid 126 located a distance d from the rim of a container 124. The force 16 causes a portion of the flexible lid 126 to be pushed down into the headspace 130. The headspace 130 may develop a headspace pressure in response to the force 16. A portion of the flexible lid 126 may deflect into the recessed lid deflection area 114 in response to the headspace pressure. For example, in the embodiment shown in FIG. 2, a downward force 16 is applied by the compression rim 106 to the outer perimeter of the flexible lid 126 just inside the rim of the container 124. The downward force 16 causes headspace pressure to develop within the headspace 130 and results in the center of the flexible lid 126 deflecting into the lid deflection area 114. The portion of the flexible lid that deflects into the recessed lid deflection area 114 may depend on the shape and/or area of the compression rim 106. In some embodiments, the compression rim 106 may apply a force to the center of the flexible rim 126. In some embodiments, the compression rim 106 may be configured to apply a force to a portion of the flexible rim located within the diameter of the container 124.

The deflection of the flexible lid 126 into the recessed lid deflection area 114 may be detected by a sensor 108. The sensor 108 may be located in any suitable location on the compression body 104 and positioned to detect the deflection of the flexible lid 126. For example, in the illustrated embodiment, the sensor 108 is located concentrically with the compression body 104. The sensor 108 is configured to detect the deflection of the center portion of the flexible lid 126. The sensor 108 may comprise any suitable sensor for detecting the deflection of the flexible lid, such as, for example, a pressure sensor, a proximity sensor, and/or a contact sensor. In some embodiments, the sensor 108 may be located in any suitable position to detect deflection of the flexible lid 126, such as, for example, on the distal end 112 of the compression body 104. The sensor 108 may detect the amount of deflection of the flexible lid 126. The sensor 108 may determine the amount of deflection of the flexible lid 126, for example, by measuring a center gap height 132 between the deflected portion of the flexible lid 126 and the distal end 112 of the compression body 104. In some embodiments, the compression body 104 may comprise a pressure release 120 to allow excess pressure to be released from the lid deflection area 114. In some embodiments, the center gap height 132 may be adjusted based on the type of flexible lid 126, the container 124 to be measured, and/or the type of sensor 108. The center gap height 132 may be adjusted, for example, by increasing a height of the compression rim 106, the ensure that the amount of deflection of a flexible lid 126 comprising a good seal or a bad seal is within the measurement range of the sensor 8. example, in some embodiments, the sensor 108 may comprise an analog proximity sensor with a specific range of measurement. The center gap height 132 may be adjusted such that the specific range of measurement of the analog proximity sensor is configured to detect deflection responses for flexible lids comprising good seals or bad seals. In some embodiments, the center gap height 132 may be related to a diameter of the flexible lid 126. For example, the center gap height 132 may be a percentage of the diameter of the flexible lid 126.

In some embodiments, the amount of deflection of the flexible lid 126 may correspond to the integrity of a seal between the flexible lid 126 and the container 124. For example, a high integrity, or good, seal between a container 124 and a flexible lid 126 may cause the headspace 130 to develop a higher headspace pressure than a low integrity, or bad, seal. A higher headspace pressure may correspond to a higher deflection of the flexible lid 126. When the integrity of the seal is low, the headspace pressure may be lower or may not be present at all. For example, if the seal between the flexible lid 126 and the container 124 comprises a low integrity seal, air may be able to leak into or out of the container. A container 124 with a low integrity seal may be referred to as a leaker. When pressure is applied to a flexible lid 126 comprising a low integrity seal, the air within the headspace 130 will leak from the container and the headspace 130 will be unable to develop proper headspace pressure. A low integrity seal may comprise various types of leaks, such as, for example, a micro-leaking seal, a slow-leaking seal, or a gross-leaking seal.

Figure 3:
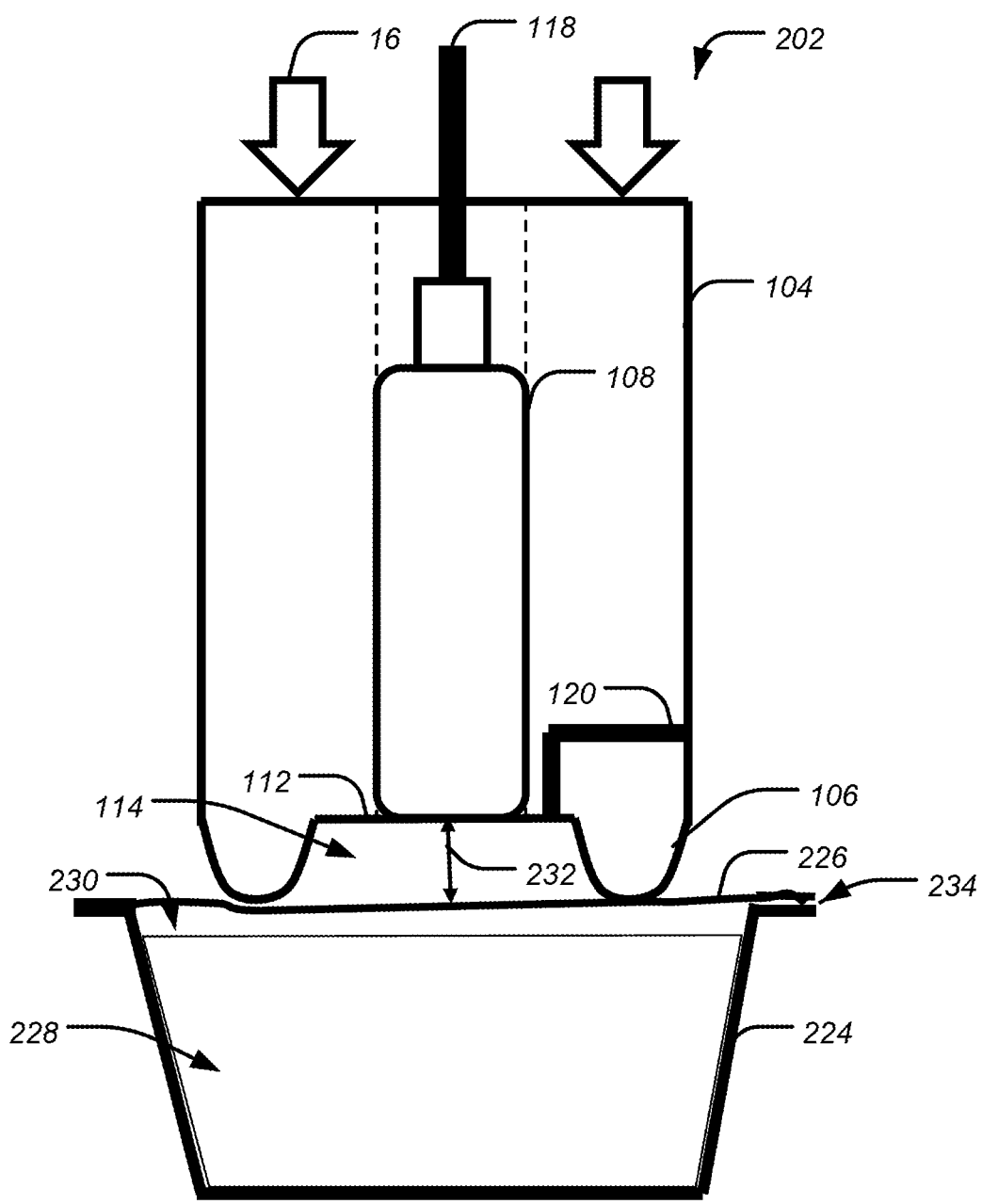
FIG. 3 illustrates one embodiment of a flexible lid seal detector and a flexible lid comprising a bad seal.

FIG. 3 illustrates one embodiment of a flexible lid detector 102 and a flexible lid 226 comprising a low-integrity seal. The container 224 and the flexible lid 226 comprises a low integrity seal 234 comprising a space between the flexible lid 226 and the container 224 that allows air to escape from or enter the container 224. Similar to the embodiment shown in FIG. 2, when a force 16 is applied to the flexible lid 226 by the compression rim 106, the compression rim 106 forces the flexible lid 226 into the headspace 230. However, because of the low integrity of the seal 234, air will be forced out of the container 224 through the seal 234 and the headspace 230 will be unable to develop sufficient headspace pressure to fully deflect the flexible lid 224 into the lid deflection area 114. In some embodiments, the seal 234 may have such low integrity that the seal 234 may not retain any headspace pressure and may result in no deflection, or in some cases compression, of the flexible lid 226.

Figure 4:
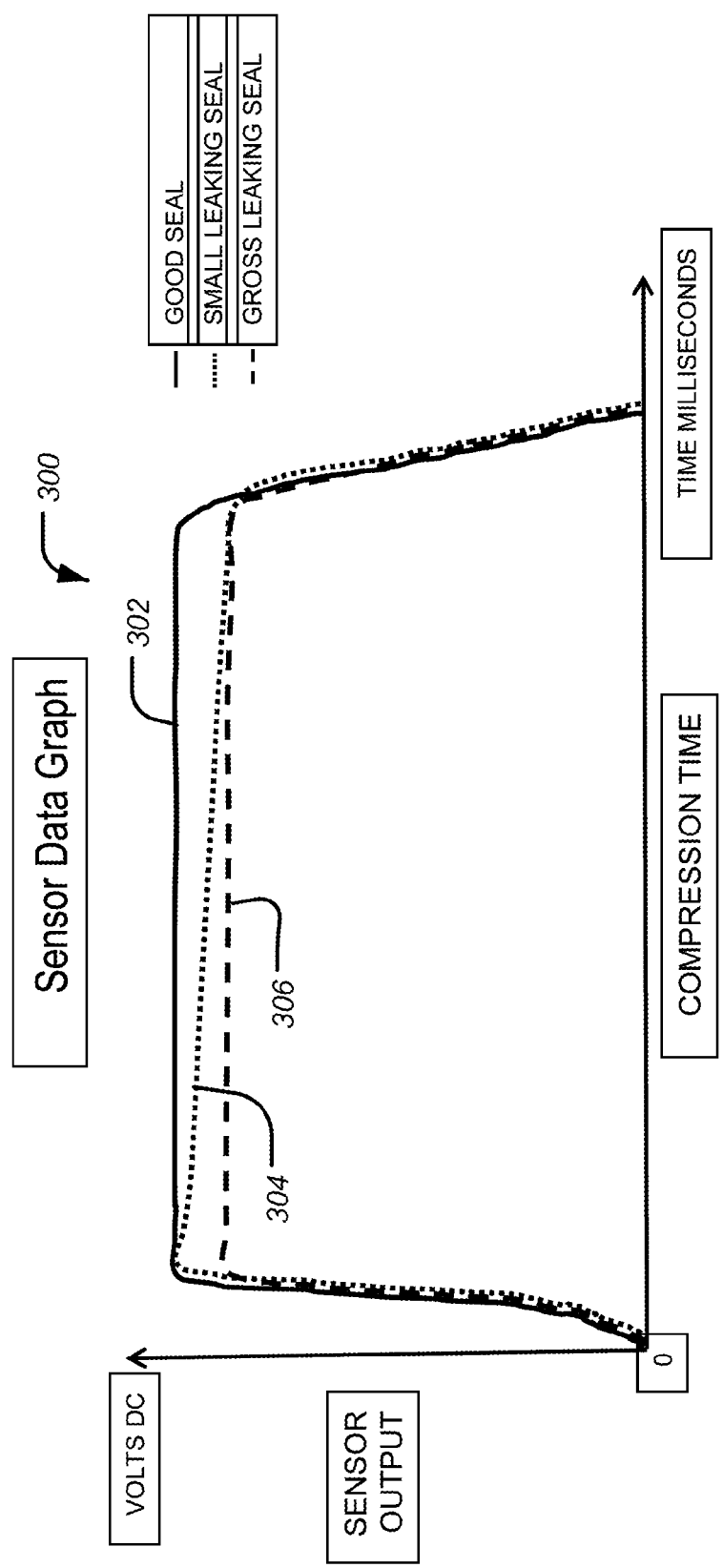
FIG. 4 illustrates one embodiment of lid seal responses.

FIG. 4 illustrates various deflection responses of flexible lids comprising different seal integrities. In operation, a compression rim may apply a force to a flexible lid coupled to a container. The flexible lid and the container may comprise a high integrity, or good, seal or a low integrity, or bad seal. A low integrity seal may comprise, for example, a seal comprising a micro-leak, or micro-leaker, a seal comprising a slow leak, or slow-leaker, or may comprise substantially no seal, or a gross-leaker. A micro-leaker may comprise a seal that allows air to escape from the container at an extremely low rate. A slow-leaker may comprise a seal that allows air to escape from a container at a slow rate. A gross-leaker may comprise a flexible lid with substantially no seal between the flexible lid and the container.

The deflection response graph 300 shows deflection responses of three flexible lids. Deflection response of flexible lids comprising a good seal 302, a slow leaking seal 304, and a gross leaking seal 306 are shown. A good seal may comprise a high integrity seal between a flexible lid and a container, such as, for example, the flexible lid 126 coupled to the container 124. The good seal 302 may prevent air from entering or leaving the container 124. When a force is applied to a flexible lid 126 comprising a good seal, headspace pressure is developed within the headspace 130 of the container 124. The headspace pressure causes a portion of the flexible lid 126 to deflect into the lid deflection area 114. The deflection of the flexible lid is detected by a sensor, for example the sensor 108. Because the seal between the flexible lid 126 and the container 124 prevents air from entering or exiting the headspace 130, the headspace pressure remains constant as the force on the flexible lid remains constant. The deflection response of the good seal 302 shows a constant deflection for the compression period. The constant deflection response of the good seal 302 may be detected by the sensor 108.

The flexible lid and the container may comprise a low integrity seal, such as micro-leaking or slow-leaking seal 304. The slow-leaking seal 304 has an initial deflection response similar to the good seal 302. However, because the slow-leaking seal 304 allows air to escape from the headspace 130, the initial deflection of the flexible lid 126 is not maintained over the entire compression period. Instead, as the air escapes from the slow leaking seal 302, the deflection of the flexible lid 126 decreases as the headspace pressure decreases. The deflection response of the slow leaking seal 302 may be detected by the sensor 108 over the compression period. A micro-leaking seal may comprise a similar deflection response to the slow leaking seal 304. The micro-leaking seal may maintain a higher headspace pressure for a longer period time than a slow leaking seal 304.

The flexible lid and the container may comprise a very low integrity seal, such as a gross leaking seal 306. The gross leaking seal 306 allows large amounts of air to escape from the container, and therefore the headspace is unable to develop substantially no headspace pressure during the compression period. The gross leaking seal 306 may have a flat deflection response over the compression time. The flat deflection response may be detected by the sensor 108. In some embodiments, the threshold for a low integrity seal may be set to a value just below the deflection response of the good seal 302.

Figure 6:
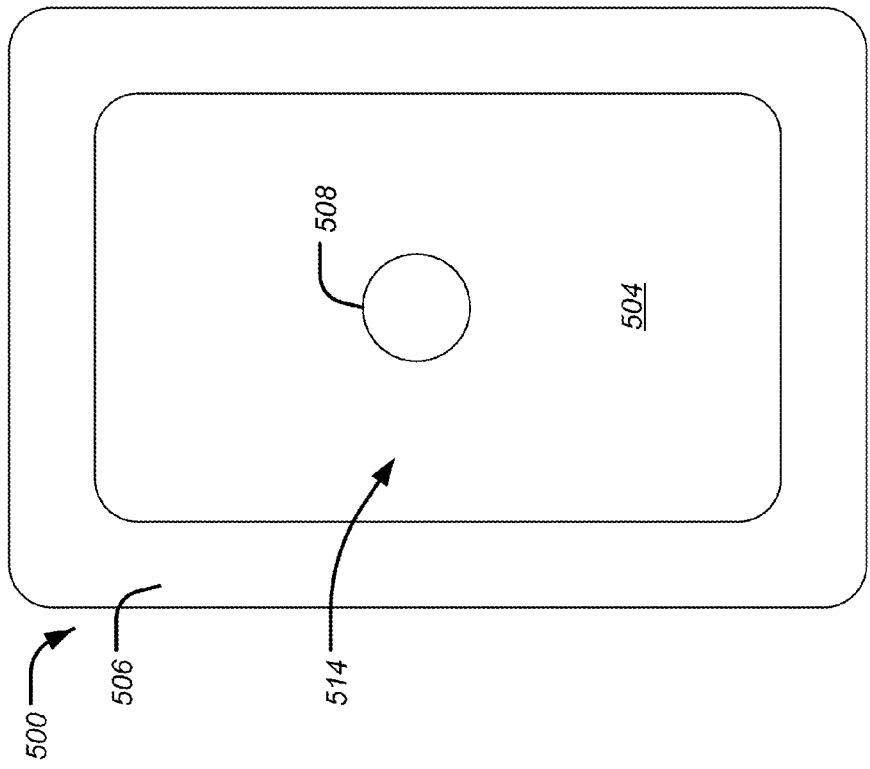
FIGS. 5 and 6 illustrate various embodiments of a distal end of a lid seal detector.
Figure 5:
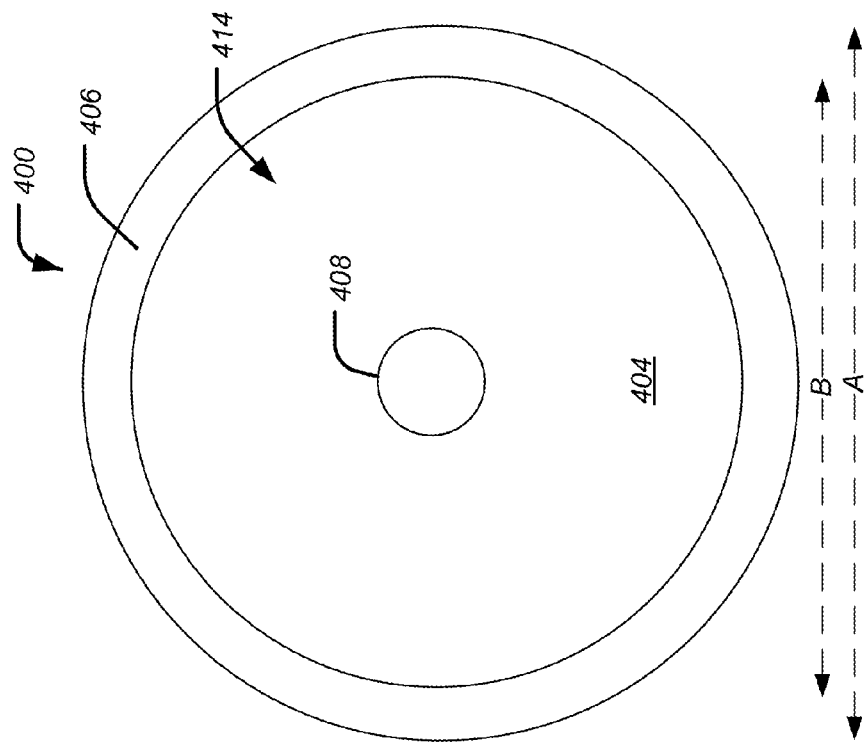

FIGS. 5 and 6 illustrate various embodiments of the distal end of a flexible lid detector. FIG. 5 illustrates a flexible lid seal detector 402 configured for use with circular flexible lids. The compression body 404 comprises a compression rim 406 that has an outer diameter A and an inner diameter B. Although in the illustrated embodiment, the outer diameter A of the compression rim 406 is equal to the outer diameter of the compression body 404, those skilled in the art will recognize that the outer diameter A of the compression rim 406 may comprise any suitable diameter for applying a force to a flexible lid. For example, in various embodiments, the outer diameter A of the compression rim 406 may comprise a diameter less than the diameter of the compression body 404 or may comprise a diameter more than the diameter of the compression body 404 (for example, extending beyond the compression body 404). The compression rim 406 may comprise an inner diameter 406 defining a recessed lid deflection area 614. A sensor 408 may be positioned, for example, concentrically on the distal end of the compression body 404 and within the lid deflection area 414.

FIG. 6 illustrates a flexible lid seal detector 502 comprising a rectangular cross-section. The flexible lid seal detector 502 comprises a rectangular compression body 504 and a rectangular compression rim 506. The flexible lid seal detector 502 may be configured for use with rectangular flexible lids. The compression rim 506 may have an outer perimeter equal to the perimeter of the compression body 504. In some embodiments, the compression rim 506 may have an outer perimeter greater than or less than the perimeter of the compression body 504. The inner perimeter of the compression rim 506 may define a lid deflection area 514. A sensor 508 may be disposed within the lid deflection area 514.

Figure 7:
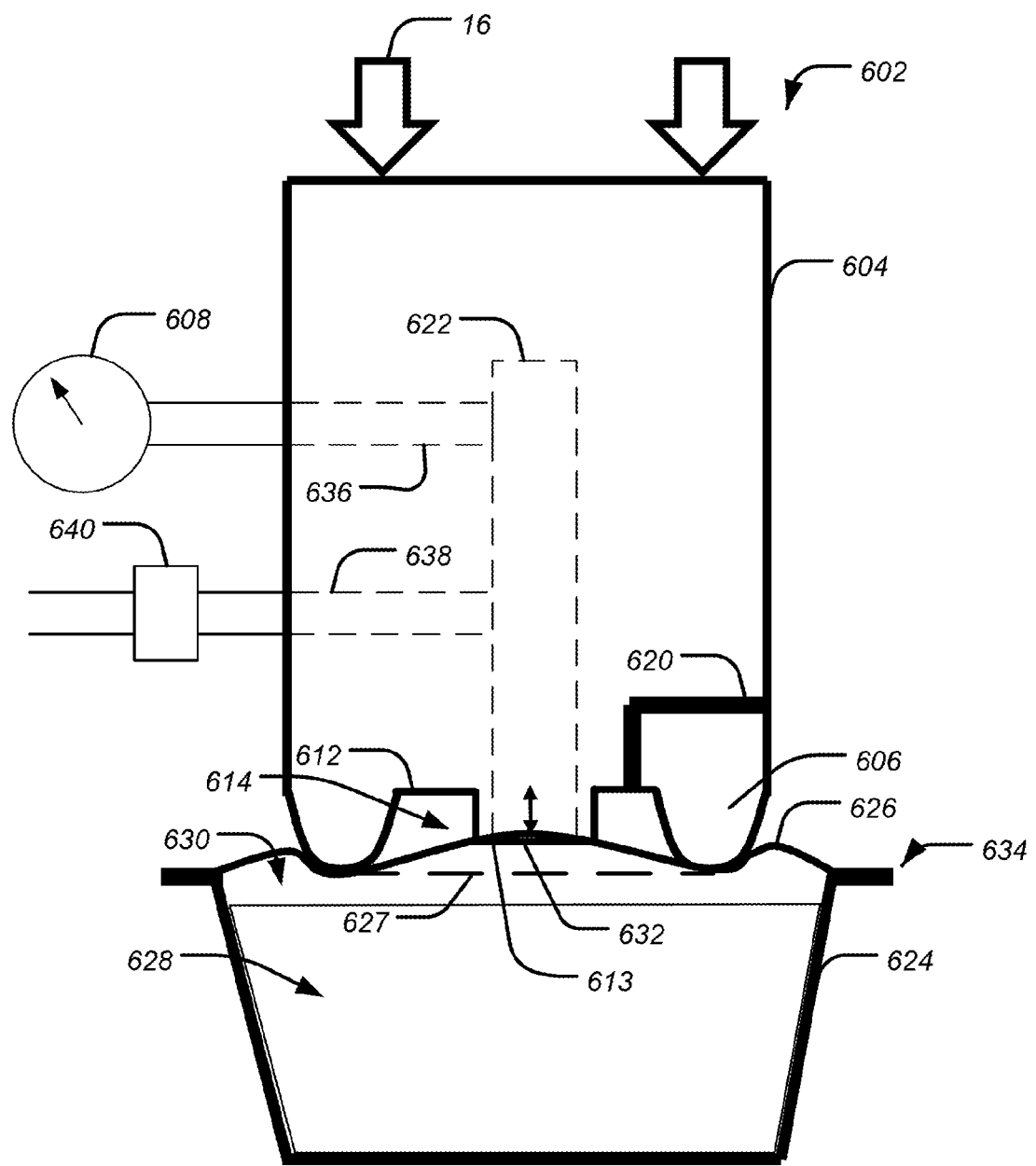
FIG. 7 illustrates one embodiment of a flexible lid seal detector and a flexible lid comprising a good seal.

FIG. 7 illustrates one embodiment of a flexible lid seal detector 602 comprising a pressure sensor 608. The flexible lid seal detector 602 comprises a compression body 604 and a compression rim 606 extending from the distal end of the compression body 604. The compression rim 606 may comprise an inner perimeter that defines a recessed lid deflection area 614. An extended portion 613 of the distal end 612 located within the recessed lid deflection area 614 extends distally from the compression body 604. The distal end of the extended portion 613 may be open. A cavity 622 may be formed within the compression body 604 and may be open at the distal end of the extend portion 613. In some embodiments, a gauge hose 636 may be coupled to the cavity 622 and may extend through the compression body 604. A pressure gauge 608 may be coupled to the gauge hose 636. When the compression rim 606 applies a force 16 to a flexible lid 626 coupled to a container 624, a headspace 630 within the container 624 may develop headspace pressure. The headspace pressure may cause the flexible lid 626 to deflect into the recessed lid deflection area 614. The flexible lid 626 may contact the extended portion 613 and may seal the cavity 622 at the distal end. The deflection of the flexible lid 626 into extended portion 613 may result in a pressure increase, such as a positive pressure increase, within the cavity 622. The pressure gauge 608 may be configured to detect the pressure increase caused by the deflection of the flexible lid 626. In some embodiments, the pressure increase may be proportional to the amount of deflection of the flexible lid 626. The amount of deflection 626 may be indicative of the integrity of a seal 634 between the flexible lid 626 and the container 624. For example, a good seal may result in a greater pressure increase or a longer sustained pressure increase within the cavity 622 than a low integrity seal. A bad seal prevent the headspace 630 from developing sufficient headspace pressure to deflect the flexible lid 626 to contact the extend portion 613. For example, a flexible lid comprising a bad seal 627 may have substantially no deflection and may not contact the extended portion 613. Because the flexible lid 627 does not contact the extended portion 613, the cavity 622 is not sealed, and pressure may be allowed to escape through the pressure release 620.

In some embodiments, a release valve 640 may be coupled to the cavity 622 through a valve hose 638. The release valve 640 may be configured to release the pressure within the cavity 622 at the end of the compression time. By releasing the pressure within the cavity 622, the release valve 640 may allow the compression body to be removed from the flexible lid 626 without damaging the flexible lid 626, for example, due to the forming of a vacuum between the flexible lid 626 and the compression body 604. In some embodiments, a pressure release 620 may limit the pressure that is generated within the lid deflection area 614 by the flexible lid 626.

Figure 8:
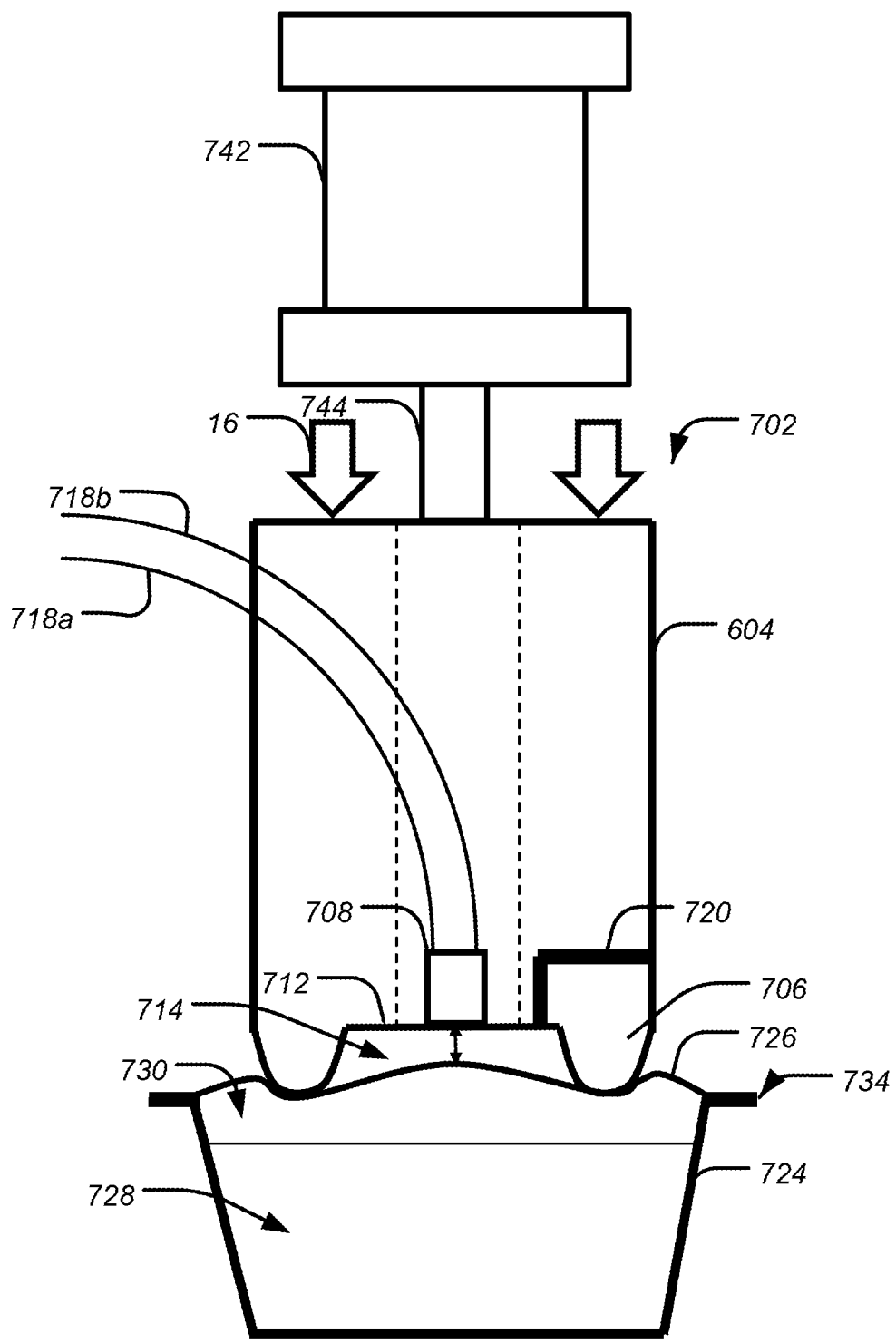
FIG. 8 illustrates one embodiment of a flexible lid seal detector coupled to a moveable cylinder.

FIG. 8 illustrates one embodiment of a flexible lid seal detector 702 coupled to an actuator 742. The flexible lid seal detector is similar to the flexible lid seal detector 102 illustrated in FIG. 2. The flexible lid seal detector 702 comprises a compression body 704 and a compression rim 706 extending from the distal end of the compression body 704. The compression rim 706 is configured to apply a force 16 to a flexible lid 726 coupled to a container 724. The compression body 704 may be coupled to an actuator 742 through a cylinder 744. The actuator may be configured to move the compression body 704 in a proximal or distal direction to apply the force 16 to a flexible lid 726. The actuator 742 may comprise any suitable device for moving the compression body 704, for example, a pneumatic cylinder, an electric cylinder, a gas cylinder, an electric actuator, and/or any other suitable actuator.

The actuator 742 may be coupled to a control system (not shown). The control system may control the actuator 742 to move the compression body 704 in a distal direction to apply a force 16 to the flexible lid 726 for a predetermined period, such as, for example, a compression period. A sensor 708 may be configured to detect the deflection of the flexible lid 726 within the lid deflection area 714 over the predetermined period. In some embodiments, the amount of deflection of the flexible lid 726 over the predetermined period may correspond to the integrity of a seal between the flexible lid 726 and the container 724. After the predetermined period, the control system may activate the actuator 742 to move the compression body 704 in a proximal direction.

Figure 9:
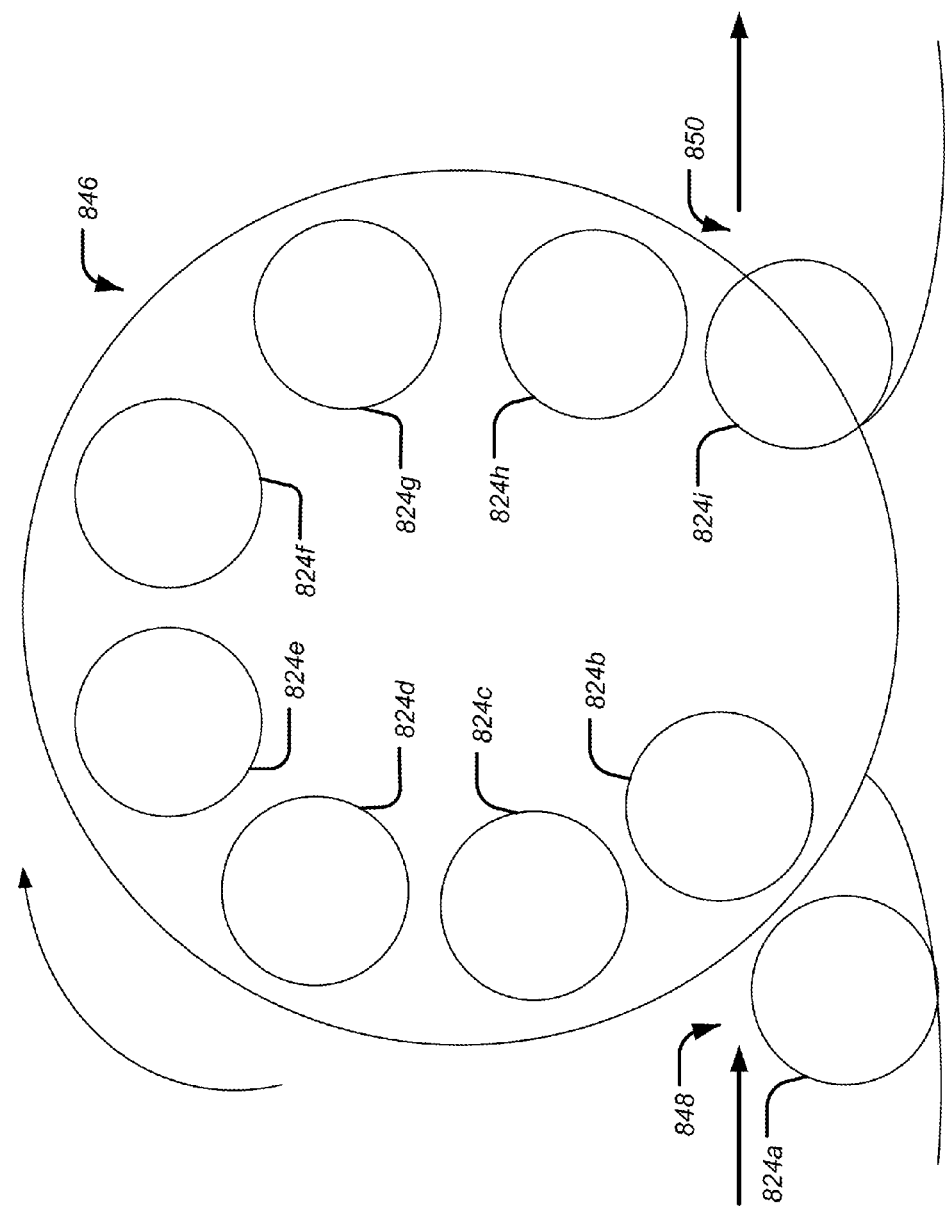
FIG. 9 illustrates one embodiment of a multiple-fixture rotary detector comprising a plurality of flexible lid seal detectors.

FIG. 9 illustrates one embodiment of a multiple-fixture rotary detector 846. The multiple-fixture rotary detector 846 may comprise multiple flexible lid seal detectors, such as, for example, a plurality of the flexible lid seal detectors 700 illustrated in FIG. 8. The multiple-fixture rotary detector 846 may allow testing of multiple seals at a high speed, such as, for example, in a factory or assembly line setting. The multiple-fixture rotary detector 846 may comprise a plurality of flexible lid seal detectors. The plurality of flexible lid seal detectors may configured around the perimeter of the multiple-fixture rotary detector 846. A container 824a-824i comprising a flexible lid sealed to the container 824a-824i may enter the multiple-fixture rotary detector 846 at an entry point 848. A flexible lid seal detector may apply a force to the flexible lid once the container 824a-824i has entered the rotary detector 846. The container 824a-824i and the flexible lid seal detector may be rotated in unison by the rotary detector 846. In some embodiments, the rotation time may comprise a predetermined period for testing a seal. At the exit position 850, the container 824a-824i may exit the multiple-fixture rotary detector 846. In some embodiments, the multiple-fixture rotary detector 846 may remove containers comprising low integrity, or leaking, seals from a production line.

Figure 10:
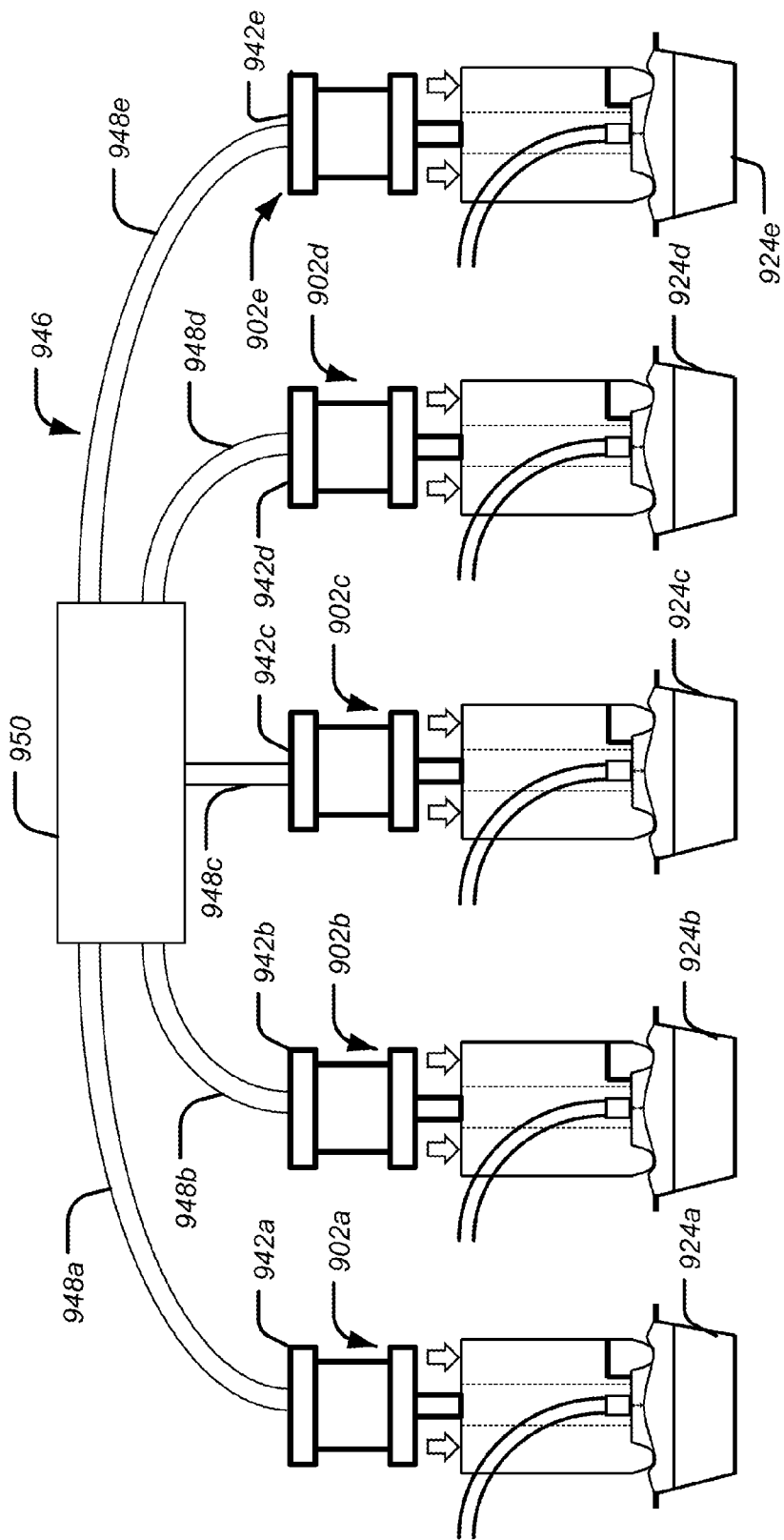
FIG. 10 illustrates one embodiment of a multiple-fixture linear detector comprising a plurality of flexible lid seal detectors.

FIG. 10 illustrates one embodiment of a multiple-fixture linear detector 946. The multiple-fixture linear detector 946 comprises a plurality of flexible lid seal detectors 902a-902e arranged in a linear arrangement. The plurality of flexible lid seal detectors are coupled to cylinders 944a-944e. The cylinders 944a-944e may be coupled to a common control box 950. The control box 950 may provide one or more control signals to the cylinders 944a-944e to control the application of a force against a plurality of containers 924a-924e. The control box 950 may provide any suitable control signal based on the type of cylinders 944a-944e used by the multiple-fixture linear detector 946. In some embodiments, the control box 950 may control air flow to the cylinders 944a-944e. The control box 950 may comprise one or more processing units for receiving signals from the sensors in each of the flexible lid seal detectors 902a-902e. The processing units may receive the signals from the sensors and may determine the integrity of a seal of the containers 924a-924e based on the sensor output. The multiple-fixture linear detector 946 may be located, for example, as part of a production line and may be configured to test multiple containers 924a-924e simultaneously. In some embodiments, the multiple-fixture linear detector 946 may be configured to detect, identify, and/or isolate containers comprising low integrity seals.

In some embodiments, a flexible lid seal detector is disclosed. The flexible lid seal detector may comprise a compression body. A compression rim may extend from a distal end of the compression body. The compression rim may comprise an outer perimeter and inner perimeter. The inner perimeter may define a recessed lid deflection area. The compression rim may be configured to apply a force to a flexible lid coupled to a container. A sensor may be coupled to the compression body and positioned to detect the deflection of the flexible lid in response to the force applied to the flexible lid. The sensor may be configured to detect an amount of deflection of the flexible lid within the recessed lid deflection area.

In some embodiments the flexible lid may be fixedly attached to the container to form a seal between the flexible lid and the container. The force applied to the flexible lid may generate a headspace pressure on the flexible lid. The headspace pressure may be proportional to the amount of deflection of the flexible lid. The amount of deflection of the flexible lid may correspond to an integrity of the seal. A processor may be electrically coupled to the sensor to determine the integrity of the seal based on the amount of deflection of the flexible lid in response to the force applied to the flexible lid.

The force may be applied to the flexible lid by the compression rim for a predetermined period. The deflection of the flexible lid may be monitored for the predetermined period.

In some embodiments, the compression rim may comprise a continuous distal surface about a perimeter of the compression body. The compression rim may comprise a rounded distal edge to prevent damage to the flexible lid during compression. The sensor may comprise a proximity sensor selected from the group consisting of: a magnetic proximity sensor, a photoelectric proximity sensor, an induction proximity sensor, an eddy current proximity sensor, and a contact sensor. The sensor may be located at the distal end of the compression body. The sensor may be positioned within the recessed lid deflection area.

In some embodiments, the container may comprise a substantially rigid container. The diameter of the compression body may be configured to be less than a diameter of the flexible lid. A distance between the outer perimeter and the inner perimeter of the compression rim may be selected to be less than the diameter of the compression body. The diameter of the compression body may be selected to be in the range of about 50% to about 95% of the diameter of the flexible lid and the distance between the outer perimeter and the inner perimeter of the compression rim may be selected to be in the range of about 5% to about 20% of the diameter of the compression body.

In various embodiments, a flexible lid seal detection system is disclosed. The flexible lid seal detection system may comprise a flexible lid seal detector. The flexible lid seal detector may comprise a compression body. A compression rim may extend from a distal end of the compression body. The compression rim may comprise an outer perimeter and inner perimeter. The inner perimeter may define a recessed lid deflection area. The compression rim may be configured to apply a force to a flexible lid coupled to a container. A sensor may be coupled to the compression body and positioned to detect the deflection of the flexible lid in response to the force applied to the flexible lid. The sensor may be configured to detect an amount of deflection of the flexible lid within the recessed lid deflection area. The cylinder may be coupled to the proximal end of the compression body. The cylinder may be configured to extend in a proximal direction. When the cylinder is in an extended position, the compression rim may apply the predetermined force to the flexible lid.

In some embodiments, the lid may be fixedly attached to the container to form a seal between the flexible lid and the container. The force applied to the flexible lid may generate a headspace pressure on the flexible lid. The headspace pressure may be proportional to the amount of deflection of the flexible lid. The amount of deflection of the flexible lid may correspond to an integrity of the seal. A processor may be electrically coupled to the sensor to determine the integrity of the seal of the flexible lid based on the amount of deflection of the flexible lid in response to the force applied to the flexible lid. The force may be applied to the flexible lid by the compression rim for a predetermined period. The deflection of the flexible lid may be monitored for the predetermined period.

In some embodiments, the compression rim may comprise a continuous surface about the perimeter of the compression body. The compression rim may comprise a rounded distal edge to prevent damage to the flexible lid during compression.

In various embodiments, a method for inspecting a seal between a container and a flexible lid is disclosed. The method may comprise compressing, using a compression body, a portion of a flexible lid. The compression body may comprise a compression rim extending from a distal end of the compression body. The compression rim may comprise an outer perimeter and an inner perimeter. The inner perimeter may define a recessed lid deflection area. The compression rim may be configured to apply a force to the flexible lid coupled to a container to form a seal. The method may further comprise detecting, by a sensor, a deflection of the flexible lid in response to the force applied to the flexible lid. The sensor may be located at the distal end of the compression body and within the recessed lid deflection area. The method may further comprise determining, by a processor, an integrity of the seal between the flexible lid and the container. An amount of deflection of the flexible lid may correspond to the seal between the flexible lid and the container. In some embodiments, the method may further comprise monitoring, by the sensor, the deflection amount of the flexible lid for a predetermined period. The deflection amount of the flexible lid over the predetermined period may correspond to the seal between the flexible lid and the container.

While various details have been set forth in the foregoing description, it will be appreciated that the various aspects systems and methods for a flexible lid seal detector may be practiced without these specific details. For example, for conciseness and clarity selected aspects have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities.

It is worthy to note that any reference to "one aspect," "an aspect," "one embodiment," or "an embodiment" means that a particular feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular features, structures or characteristics may be combined in any suitable manner in one or more aspects.

Some aspects may be described using the expression "coupled" and "connected" along with their derivatives. It should be understood that these terms are not intended as synonyms for each other. For example, some aspects may be described using the term "connected" to indicate that two or more elements are in direct physical or electrical contact with each other. In another example, some aspects may be described using the term "coupled" to indicate that two or more elements are in direct physical or electrical contact. The term "coupled," however, also may mean that two or more elements are not in direct contact with each other, but yet still co-operate or interact with each other.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.). In some embodiments, the signal bearing medium may comprise a non-transitory storage medium.

All of the above-mentioned U.S. patents, U.S. patent application publications, U.S. patent applications, foreign patents, foreign patent applications, non-patent publications referred to in this specification and/or listed in any Application Data Sheet, or any other disclosure material are incorporated herein by reference, to the extent not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

A sale of a system or method may occur in a territory even if components of the system or method are located and/or used outside the territory. Further, implementation of at least part of a system for performing a method in one territory does not preclude use of the system in another territory.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

What is claimed is:

1. A flexible lid seal detector comprising:
    a compression body;
    a compression rim extending from a distal end of the compression body, wherein the compression rim comprises an outer perimeter and inner perimeter, wherein the inner perimeter defines a recessed inner lid deflection area and the outer perimeter defines an outer lid deflection area, wherein the compression rim is configured to apply a force to a flexible lid coupled to a container, wherein the force applied to the flexible lid causes at least two distinct portions of the flexible lid to be deflected in a direction opposite of the applied force, wherein a first portion of the flexible lid is deflected into the inner lid deflection area and at least a second portion of the flexible lid is deflected into the outer lid deflection area; and
    a sensor coupled to the compression body and positioned to detect the deflection of the flexible lid in response to the force applied to the flexible lid, wherein the sensor is configured to detect an amount of deflection of the flexible lid within the recessed lid deflection area.

2. The flexible lid seal detector of claim 1, wherein the flexible lid is fixedly attached to the container to form a seal between the flexible lid and the container, wherein the force applied to the flexible lid generates a headspace pressure on the flexible lid, and wherein the headspace pressure is proportional to the amount of deflection of the flexible lid.

3. The flexible lid seal detector of claim 2, wherein the amount of deflection of the flexible lid corresponds to an integrity of the seal.

4. The flexible lid seal detector of claim 3, comprising a processor electrically coupled to the sensor to determine the integrity of the seal based on the amount of deflection of the flexible lid in response to the force applied to the flexible lid.

5. The flexible lid seal detector of claim 4, wherein the force is applied to the flexible lid by the compression rim for a predetermined period, and wherein the deflection of the flexible lid is monitored for the predetermined period.

6. The flexible lid seal detector of claim 1, wherein the compression rim comprises a continuous distal surface about a perimeter of the compression body.

7. The flexible lid seal integrity sensor of claim 1, wherein the compression rim comprises a rounded distal edge to prevent damage to the flexible lid during compression.

8. The flexible lid seal detector of claim 1, wherein the sensor comprises a proximity sensor selected from the group consisting of: a magnetic proximity sensor, a photoelectric proximity sensor, an induction proximity sensor, an eddy current proximity sensor, and a contact sensor.

9. The flexible lid seal detector of claim 1, wherein the sensor is located at the distal end of the compression body.

10. The flexible lid seal detector of claim 9, wherein the sensor is positioned within the recessed lid deflection area.

11. The flexible lid seal detector of claim 1, wherein the container comprises a substantially rigid container.

12. The flexible lid seal detector of claim 1, wherein a diameter of the compression body is configured to be less than a diameter of the flexible lid, and wherein a distance between the outer perimeter and the inner perimeter of the compression rim is selected to be less than the diameter of the compression body.

13. A flexible lid seal detection system, comprising:
a flexible lid seal detector comprising:
- a compression body;
- a compression rim extending from a distal end of the compression body, wherein the compression rim comprises an outer perimeter and inner perimeter, wherein the inner perimeter defines a recessed inner lid deflection area and the outer perimeter defines an outer lid deflection area, wherein the compression rim is configured to apply a force to a flexible lid coupled to a container, wherein the force applied to the flexible lid causes at least two distinct portions of the flexible lid to be deflected in a direction opposite of the applied force, wherein a first portion of the flexible lid is deflected into the inner lid deflection area and at least a second portion of the flexible lid is deflected into the outer lid deflection area; and
- a sensor coupled to the compression body and positioned to detect the deflection of the flexible lid in response to the force applied to the flexible lid, wherein the sensor is configured to detect an amount of deflection of the flexible lid within the recessed lid deflection area; and
a cylinder coupled to the proximal end of the compression body, wherein the cylinder is configured to extend in a proximal direction, wherein when the cylinder is in an extended position, the compression rim applies the predetermined force to the flexible lid.

14. The flexible lid seal detector of claim 13, wherein the lid is fixedly attached to the container to form a seal between the flexible lid and the container, wherein the force applied to the flexible lid generates a headspace pressure on the flexible lid, and wherein the headspace pressure is proportional to the amount of deflection of the flexible lid.

15. The flexible lid seal detector of claim 14, wherein the amount of deflection of the flexible lid corresponds to an integrity of the seal.

16. The flexible lid seal detector of claim 15, comprising:
a processor electrically coupled to the sensor to determine the integrity of the seal of the flexible lid based on the amount of deflection of the flexible lid in response to the force applied to the flexible lid.

17. The flexible lid seal detector of claim 16, wherein the force is applied to the flexible lid by the compression rim for a predetermined period, and wherein the deflection of the flexible lid is monitored for the predetermined period.

18. The system of claim 13, wherein the compression rim comprises a continuous surface about a perimeter of the compression body.

19. The system of claim 13, wherein the compression rim comprises a rounded distal edge to prevent damage to the flexible lid during compression.

20. A method for inspecting a seal between a container and a flexible lid, the method comprising:
- compressing, using a compression body, at least two distinct portions of the flexible lid, wherein the compression body comprises a compression rim extending from a distal end of the compression body, wherein the compression rim comprises an outer perimeter and an inner perimeter, wherein the inner perimeter defines a recessed inner lid deflection area and the outer perimeter defines an outer lid deflection area, wherein the compression rim is configured to apply a force to the flexible lid coupled to the container to form the seal;
- applying, by the compression rim, a force to the flexible lid;
- deflecting a first portion of the flexible lid in a direction opposite of the applied force into the inner lid deflection area and deflecting at least a second portion of the flexible lid in a direction opposite of the applied force into the outer lid deflection area;
- detecting, by a sensor, a deflection of the flexible lid in response to the force applied to the flexible lid, wherein the sensor is located at the distal end of the compression body and within the recessed lid deflection area; and
- determining, by a processor, an integrity of the seal between the flexible lid and the container, wherein an amount of deflection of the flexible lid corresponds to the seal between the flexible lid and the container.

21. The method of claim 20, comprising:
monitoring, by the sensor, the deflection amount of the flexible lid for a predetermined period, wherein the deflection amount of the flexible lid over the predetermined period corresponds to the seal between the flexible lid and the container.

* * * * *